(12) United States Patent
Sutherland

(10) Patent No.: US 11,189,412 B2
(45) Date of Patent: Nov. 30, 2021

(54) INLINE DEMAGNETIZATION FOR OPERATIONAL PIPELINES

(71) Applicant: Baker Hughes Oilfield Operations LLC., Houston, TX (US)

(72) Inventor: Jeffrey Earle Sutherland, Calgary (CA)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 148 days.

(21) Appl. No.: 16/423,518

(22) Filed: May 28, 2019

(65) Prior Publication Data

US 2020/0381157 A1   Dec. 3, 2020

(51) Int. Cl.
*H01F 13/00* (2006.01)
*F16L 55/26* (2006.01)

(52) U.S. Cl.
CPC ............ *H01F 13/006* (2013.01); *F16L 55/26* (2013.01)

(58) Field of Classification Search
CPC ........ G01N 27/82; G01N 27/83; G01N 27/87; G01N 27/902; G01N 27/9033; G01N 27/9046; G01N 27/9066; H01F 13/006; H01F 13/00; F16L 55/26
See application file for complete search history.

(56) References Cited

U.S. PATENT DOCUMENTS

| | | | | |
|---|---|---|---|---|
| 3,593,122 A | * | 7/1971 | Barton | G01N 27/9093 324/220 |
| 5,581,037 A | * | 12/1996 | Kwun | G01N 29/14 73/623 |
| 8,542,127 B1 | * | 9/2013 | Goroshevskiy | G01N 27/82 340/657 |
| 2001/0017541 A1 | * | 8/2001 | Kwun | G01N 29/265 324/240 |
| 2009/0072937 A1 | * | 3/2009 | Holley | H01F 13/006 335/284 |
| 2011/0100981 A1 | * | 5/2011 | Lim | H01F 13/006 219/635 |
| 2016/0231278 A1 | * | 8/2016 | Goroshevskiy | G01L 1/12 |

(Continued)

OTHER PUBLICATIONS

Office Action issued in Canadian Application No. 3,082,225, dated Jun. 22, 2021, 4 pages.

*Primary Examiner* — Jue Zhang
(74) *Attorney, Agent, or Firm* — Mintz Levin Cohn Ferris Glovsky and Popeo, PC; Lisa Adams

(57) ABSTRACT

Systems, methods, and a computer readable medium are provided for demagnetizing a pipe within an operational pipeline. An inline demagnetization device can be positioned in a first location within a pipe of an operational pipeline. The inline demagnetization device can be positioned via a plurality of positioning mechanisms operable to position the inline demagnetization device at one or more locations within the pipe. The inline demagnetization device can transmit magnetic fields into the pipe at the first location via a plurality of magnetic field conductors configured within the inline demagnetization device. The transmitted magnetic field can cause a reduction of magnetization present in the pipe. The inline demagnetization device can be positioned in a second location to further reduce the magnetization present at the second location.

23 Claims, 13 Drawing Sheets

(56) References Cited

U.S. PATENT DOCUMENTS

| | | | |
|---|---|---|---|
| 2018/0023384 A1* | 1/2018 | Girrell | E21B 47/12 |
| | | | 702/6 |
| 2019/0145933 A1* | 5/2019 | Feng | G01N 27/904 |
| | | | 324/220 |
| 2019/0368664 A1* | 12/2019 | Wu | G01M 3/18 |
| 2020/0294699 A1* | 9/2020 | Zhang | H01F 7/0221 |

* cited by examiner

INLINE DEMAGNETIZATION FOR OPERATIONAL PIPELINES

BACKGROUND

Operational pipelines, such as those used in oil and gas production environments, can include pipes constructed from iron-containing ferrous metals such as steel, carbon steel, cast iron, or ferrous metal alloys. Ferrous metals can be desirable materials for pipe construction due to their tensile strength and durability. Due to the presence of iron in ferrous metals, objects constructed from ferrous metals can exhibit magnetic properties.

For example, the pipes of operational pipelines can be inspected for corrosion or damage, such as pitting or missing metal, using non-destructive techniques which apply magnetic fields to the pipes. One such technique, called magnetic flux leakage (MFL), applies a strong magnetic field to a pipe to determine locations of the pipe which may be damaged in order to estimate an amount of metal loss at the location. Such techniques may leave the pipe or portions of the pipe in a magnetized state including a small, residual magnetic field that persists after the MFL detector has passed through a particular portion of a pipe. As a result the ability to perform subsequent operations on the pipe, such as welding or repairs, can be adversely affected due to hazardous conditions that arise when the residual magnetic field is combined with electrically charged or ionized weld liquefaction material.

To mitigate the residual magnetic field remaining in a pipe after the use of a magnetic inspection or cleaning device, pipeline operators may employ various demagnetization techniques. Such techniques include a number of drawbacks. For example, one technique may use electrical wiring wrapped multiple times around the exterior of the pipe to convey varying electromagnetic currents into the pipe in order to reduce the residual magnetism. This approach requires external access to the full circumference of the pipe which can require expensive excavation equipment and can cause disruptions in the operation of the pipe or pipeline in order to wrap the pipe with the electrical wiring. Other demagnetization techniques can use permanent or portable demagnetization tools to reduce or eliminate the residual magnetic field in the pipe. Permanent demagnetization tools can be installed at a single location and may require a large distribution of many tools along the length of a pipe. Portable demagnetization tools can alleviate the costs of deploying large numbers of permanent demagnetization tools along the length of a pipe, but can require significant configuration efforts to re-apply the portable demagnetization tool to subsequent locations along the length of the pipe once a residual magnetic field has been remedied in a first location of the pipe.

SUMMARY

In one aspect, systems are provided. In one embodiment, the system can include an inline demagnetization device configured for travel within a pipe of an operational pipeline. The inline demagnetization device can include a self-contained power supply and a plurality of positioning mechanisms. Each positioning mechanism can be operable to position the inline demagnetization device within the pipe. The inline demagnetization device can also include a plurality of magnetic field conductors. Each of the magnetic field conductors can be configured to generate magnetic fields into the pipe at a first location. The generated magnetic fields can cause a reduction of magnetization in the pipe at the first location. The inline demagnetization device can also include a controller. The controller can be coupled to the inline demagnetization device and can include a processor and a memory. The processor can be configured to execute computer-readable, executable instructions stored in the memory. The instructions, when executed, can cause the processor to perform operations including positioning the inline demagnetization device in the first location within the pipe. The instructions, when executed, can also cause the processor to transmit the magnetic fields into the pipe at the first location and can further cause the processor to position the inline demagnetization device in a second location within the pipe.

In another aspect, methods are provided. In one embodiment, the method can include positioning an inline demagnetization device in a first location within a pipe of an operational pipeline via a plurality of positioning mechanisms. The positioning mechanisms can be operable to position the inline demagnetization device at one or more locations within the pipe. The method can also include transmitting magnetic fields into the pipe at the first location via a plurality of magnetic field conductors. The magnetic field conductors can be configured to generate magnetic fields into the pipe at a first location and to cause a reduction of magnetization in the pipe at the first location. The method can further include positioning the inline demagnetization device in a second location within the pipe via the plurality of positioning mechanisms.

Non-transitory computer program products (i.e., physically embodied computer program products) are also described that store instructions, which when executed by one or more data processors of one or more computing systems, causes at least one data processor to perform operations described herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
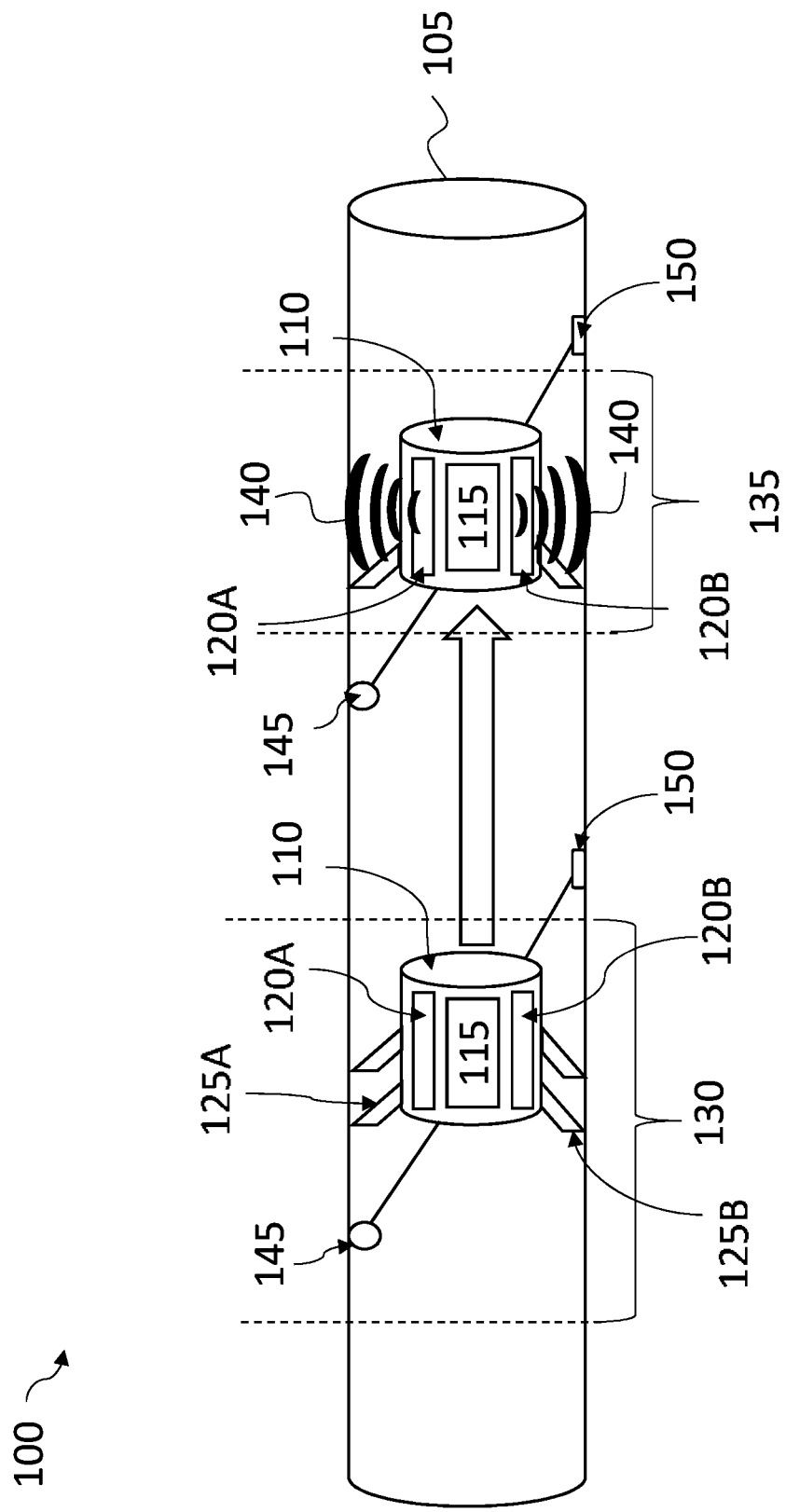
FIG. 1 depicts a system diagram illustrating an inline demagnetization system.

Magnetic fields present in pipelines, such as pipes or portions of pipes in use at oil and gas production or refinery facilities, can hinder inspection and repair efforts of the pipelines. The presence of residual magnetic fields in the pipeline material are particularly problematic in regard to scheduling and performing efficient repair of operation pipelines which are in use and delivering a product, such as oil or gas, from one location to another within the pipeline. Welding practices and methods can be disrupted by such residual magnetism, particularly at locations where air gaps are present between pipes. In such locations, applications of welding flux or other similar repair materials may be distorted due to the presence of a residual magnetic field, leading to additional repair or mitigation efforts which can further cause overall uncertainty in the repair's timing, and uncertainty of the pipeline outage schedule. Disrupting ongoing operations of a pipeline for inspection or repair of a pipe can require significant resources and complex logistical arrangements. As a result, production costs associated with the product contained within the pipe may be increased. In addition, shutting down an operational pipeline can strain limited manpower and human resources necessary to plan and perform the shutdown of an operational pipeline so that a pipe or portions of a pipe therein can be demagnetized.

Magnetic fields can be present at more than one location within a pipe or a portion of a pipeline and may be separated by locations where no magnetic field exists. Establishing pipeline access and performing manual demagnetization efforts at multiple locations of magnetized pipe can further increase the complexities and costs of general repair procedures. The time and resources required to repair pipe in multiple locations is exacerbated because of needing to reposition, reconfigure and re-perform demagnetization procedures at each location.

As described herein, a demagnetization system can be configured to demagnetize pipe or portions of pipe while the pipe is in operation. The inline demagnetization system can travel within an operational pipeline and can demagnetize pipe or portions of pipe at multiple locations within the pipeline. In this way, pipeline operators can deploy the inline demagnetization system into the pipeline at a first location and can navigate the inline demagnetization system to a second location where it is necessary to reduce a magnetic field occurring at the second location. One such embodiment would allow pipeline operators to maneuver or otherwise position the inline demagnetization system to a desired location with robotic or mechanical means, without having to shut down operations of the pipeline prior to performing demagnification operations. In another embodiment, the inline demagnetization system can be configured to flow within the operational pipeline with the pipeline product, while continuously demagnetizing the pipeline wall. As a result the added complexity, increased costs and logistical planning necessary to perform inspection and repair of the pipe is reduced.

FIG. 1 is a system diagram 100 illustrating an inline demagnetization system 110. As shown in FIG. 1, a portion of an operational pipeline 105 is illustrated. An inline demagnetization system 110 is positioned in a first location 130. The inline demagnetization system 110 includes a self-contained power supply 115, such as a battery. The inline demagnetization system 110 also includes a plurality of magnetic field conductors, referred to individually as magnetic field conductors 120A and 120B. The plurality of magnetic field conductors will be collectively referred to as magnetic field conductors 120 and are configured to emit a magnetic field at predetermined sequences of frequencies and amplitudes necessary to reduce or eliminate a magnetic field occurring with the pipe 105. The inline demagnetization system 110 also includes a plurality of positioning mechanisms, referred to individually as positioning mechanism 125A and 125B. The plurality of positioning mechanisms will be collectively referred to as positioning mechanisms 125 and are configured to position the inline demagnetization system 110 within the pipe 105.

The inline demagnetization system 110 also includes a position sensing system 145 that can be configured to measure movement and travel of the inline demagnetization system 110.

The inline demagnetization system 110 also includes a magnetic field sensing system 150 that is separate and distinct from the magnetic field conductors 120. Data from the magnetic field sensing system 150 may be provided as inputs to the inline demagnetization system 110 to determine the strength of a magnetic field at a particular location of the pipe 105 and to position the inline demagnetization system 110 at the particular location. In this way, the magnetic field conductors 120 can transmit magnetic fields into the pipe at the particular location in response to conditions of local pipeline residual magnetization which were measured by the magnetic field sensing system 150.

As shown in FIG. 1, the inline demagnetization system 110 is located at a first position 130 of pipe 105. The inline demagnetization system 110 may be placed at the first position 130 by way of accessing the pipe 105 in a location proximate to the first location 130. Alternatively, the inline demagnetization system 110 may be located at the first position 130 as result of navigating, moving, or positioning the system 110 in the first 130 using the positioning mechanisms 125. The positioning mechanisms 125 can be configured to actively cause the inline demagnetization system 110 to move in an axial direction within the pipe 105, such as moving forward or backward within the pipe 105, independent of a direction of flow of a product within the pipe 105. In an active movement mode, the positioning mechanisms 125 are operably coupled to the self-contained power supply 115 allowing the inline demagnetization system 110 to move through the pipe 105 without external power. In this way, the inline demagnetization system 110 can move or relocate from a first location 130 to a second location 135 within the pipe 105 using only the power available from the self-contained power supply 115.

As further shown in FIG. 1, the inline demagnetization system 110 can be actively repositioned to a second location 135. For example, once the inline demagnetization system 110 has effectively reduced the magnetic field present in the first location 130 of pipe 105, the system 110 can be moved, via the positioning mechanisms 125, to the second location 135 where additional demagnetization of pipe 105 is required. The second location 135 may be determined as a result of processing the data received from the position sensing system 145 and/or the magnetic field sensing system 150.

In some embodiments, the positioning mechanisms 125 can be configured to also cause the inline demagnetization system 110 to move in a direction that is opposite to the direction in which the product within the pipe 105 is flowing. In this way, the inline demagnetization system 110 may navigate pipeline branches and/or gaps that are present between sections of the pipe 105.

In operation, once the system 110 reaches the second location 135, the system 110 can be controlled to emit a magnetic field 140 from the magnetic field conductors 120. The magnetic field 140 emitted by the magnetic field conductors 120 is emitted at amplitudes and frequencies determined to reduce or eliminate the magnetic field present in the pipe 105 at the second location 135. In this way, the system 110 can continue to actively move itself to multiple locations of the pipe 105, under its own power, and to perform demagnetization of the pipe 105 at the multiple locations while the pipe 105 remains in operating transporting a product contained therein.

In a passive movement mode, the inline demagnetization system 110 may start at the first position 130, and can be propelled by the flow of a product flowing within the pipeline causing the inline demagnetization system 110 to move in an axial direction within the pipe 105 to the second location 135. At the second location 135, the inline demagnetization system 110 can be controlled to emit a magnetic field 140 from the magnetic field conductors 120. In some embodiments, the inline demagnetization system 110 can emit a magnetic field 140 from the magnetic field conductors 120 based on a detected change in position received from the position sensing system 145. The magnetic field 140 emitted by the magnetic field conductors 120 is emitted at amplitudes and frequencies determined to reduce or eliminate the magnetic field present within the pipe 105 at the second location 135. In this way, the system 110 can continue to perform demagnetization of the pipe 105 at multiple locations while the pipe 105 remains in operation transporting a product contained therein.

Figure 2A:
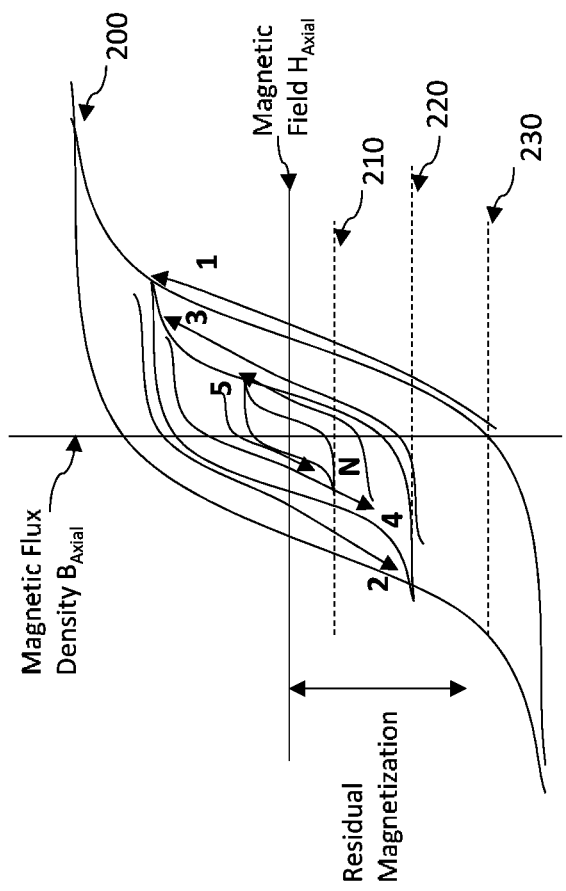
FIG. 2A illustrates an inherent magnetization pattern exhibited by a ferromagnetic material.

FIG. 2A illustrates an inherent magnetization pattern exhibited by a ferromagnetic material, such as a ferromagnetic material forming pipe 105. As shown in FIG. 2A, the magnetization pattern 200 represents a hysteresis curve of the ferromagnetic material. The magnetization pattern is illustrated on a plot representing the magnetic field on the X-axis and the magnetic flux density on the Y-axis. The amount or level of residual magnetization can vary and can be represented as one or more levels of residual magnetization 210, 220, and 230, within the pipe 105.

Figure 2B:
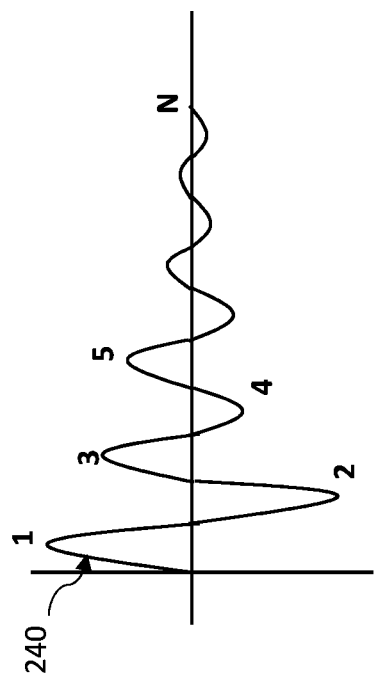
FIG. 2B illustrates a magnetic field transmission pattern generated and transmitted by the magnetic field conductors of the inline demagnetization system described in relation to FIG. 1.

FIG. 2B illustrates a magnetic field transmission pattern 240 generated and transmitted by the magnetic field conductors 120 of the inline demagnetization system 110 described in relation to FIG. 1. As shown in FIG. 2B, points 1-5 of the magnetic field transmission pattern 240 can represent decreasing frequencies and amplitudes of the transmitted magnetic field 140. The magnetic fields 140 cause the magnetic state at a particular location of the pipe wall 105 to change and transition through different magnetic states, such as from state 230, to state 220 and finally to a targeted residual magnetization level 210 as shown in FIG. 2A. The magnetic field conductors 120 may repeatedly emit the magnetic field transmission pattern 240 multiple times within a given demagnetization cycle step and/or with alternate frequencies in successive sequences and/or applied simultaneously.

Figure 2C:
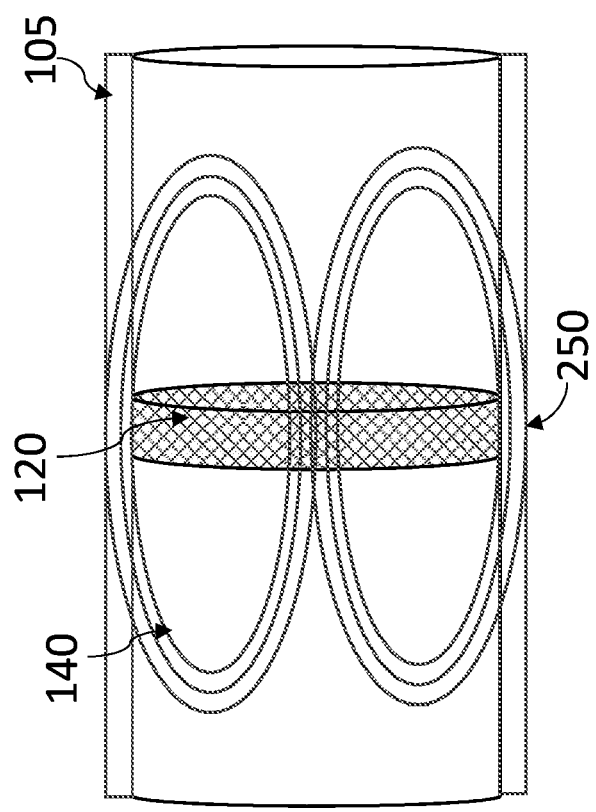
FIGS. 2C-2E illustrate different exemplary embodiments of magnetic fields that can be generated from the magnetic conductors of the inline demagnetization system described in relation to FIG. 1.
Figure 2D:
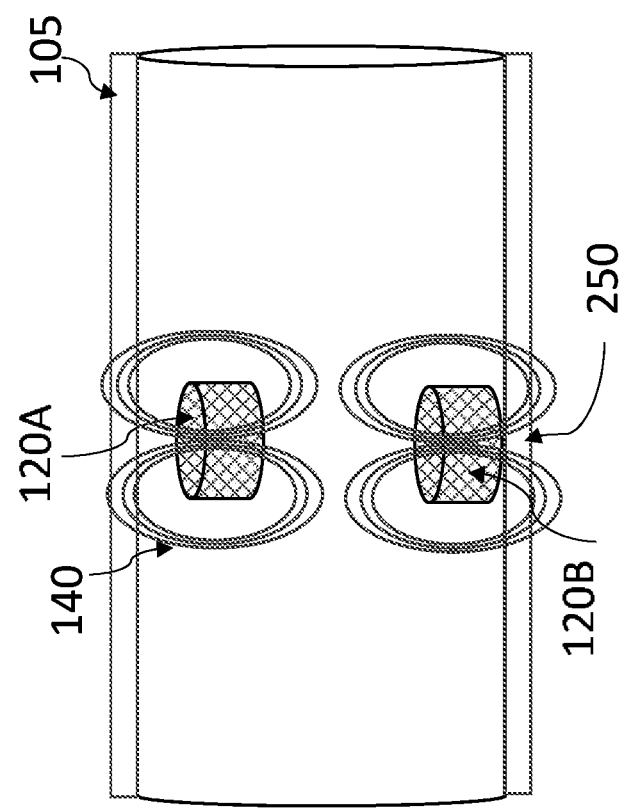
Figure 2E:
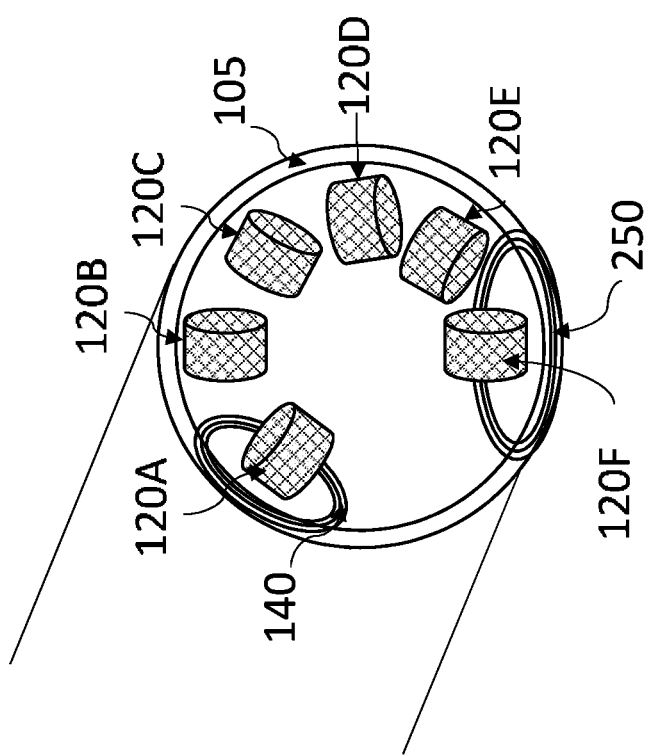

With the foregoing in mind, FIGS. 2C-2E illustrate different embodiments of magnetic fields 140 that can be generated from the magnetic conductors 120 of the inline demagnetization system 110 described in relation to FIG. 1, preferably as varying, decreasing frequencies and amplitudes such as pattern 240 described in relation to FIGS. 2A-2B. As shown in FIGS. 2C-2E, a given physical point 250 can exist at any location within the pipe wall 105, such as locations 130 or 135. At location 250, the pipe wall can exhibit a magnetization state and properties as shown in the magnetization pattern 200 of FIG. 2A. The pipe wall material at the given physical point 250 within pipe wall 105, in the absence of an external magnetic field, will exhibit a hysteresis behavior of the magnetization pattern 200 in all 3 physical directions and may have a non-zero residual magnetization state 210 in any of the 3 directions.

As shown in FIG. 2C, a magnetic field conductor 120 can be configured to generate and transmit magnetic fields 140 in an axial direction in order to disrupt and reduce axially oriented residual magnetism 200 present in the pipe wall 105 at point 250.

As shown in FIG. 2D, magnetic field conductors 120A and 120B can be configured to generate and transmit magnetic fields in a radial direction in order to disrupt and reduce radially oriented residual magnetism 200 in pipe wall 105 at point 250.

As shown in FIG. 2E, magnetic field conductors 120A-120E can be configured to generate and transmit magnetic fields in a circumreferencial direction in order to disrupt and reduce circumferentially oriented residual magnetism 200 in pipe wall 105 at point 250.

Figure 2G:
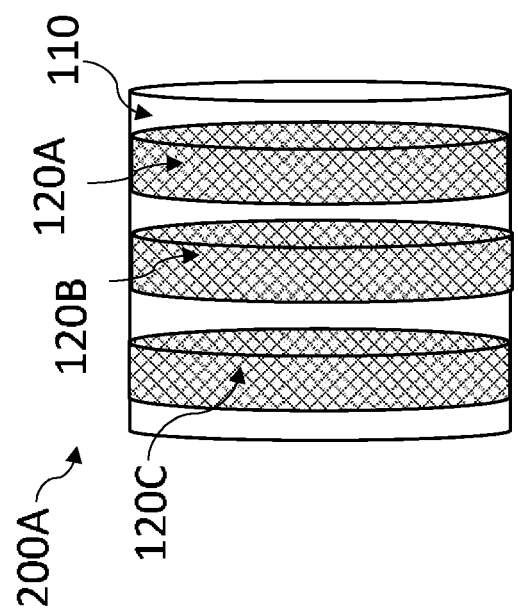
FIGS. 2F-2G illustrate exemplary embodiments of one configuration of a plurality of magnetic field conductors that can be configured within the inline demagnetization system of FIG. 1.
Figure 2F:
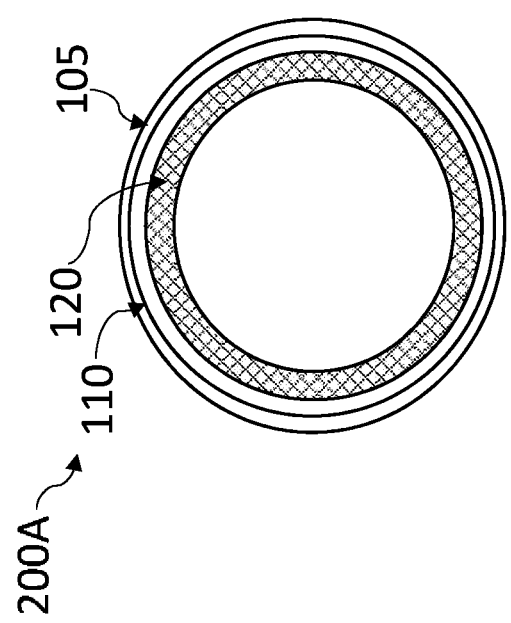

FIGS. 2F-2G illustrate exemplary embodiments of one configuration 200A of a plurality of magnetic field conductors that can be configured within the inline demagnetization system 110 of FIG. 1. FIG. 2F illustrates an axial view of the inline demagnetization system 110 positioned within pipe 105. As shown in FIG. 2F, each of the magnetic field conductors 120 are configured in an annular arrangement and positioned proximate to the circumference of the system 110 and the pipe 105.

FIG. 2G illustrates a cross-sectional view of the inline demagnetization system 110 of FIG. 1 and corresponds to the configuration 200A introduced in FIG. 2F. As shown in FIG. 2G, the configuration 200A includes three magnetic field conductors 120 (e.g., 120A, 120B, and 120C) arranged as a plurality of ring-shaped magnetic field conductors 120. A number of magnetic field conductors 120 may be contemplated in configuration 200A. For example, the inline demagnetization system 110 arranged in configuration 200A can include 1, 2, 3, 4, 5, 6, 7, 8, 9, or more magnetic field conductors 120. In some embodiments, the spacing between each of the magnetic field conductors 120 can be similar or equal. In some embodiments, the spacing between each of the magnetic field conductors 120 can vary or be dissimilar.

Figure 2I:
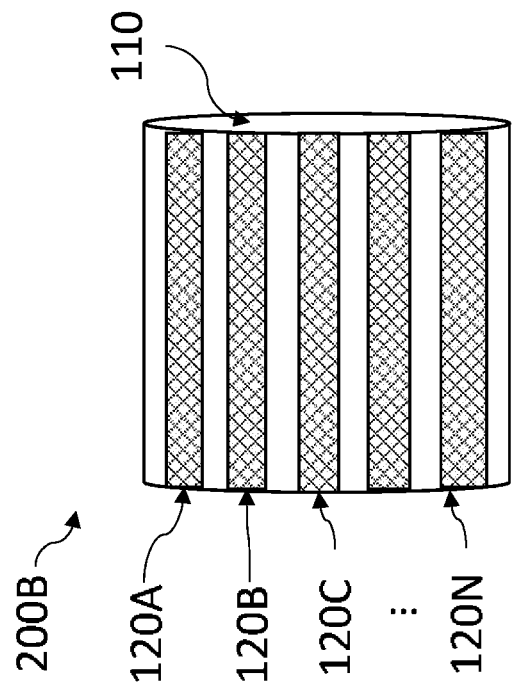
FIGS. 2H-2I illustrate exemplary embodiments of a second configuration of a plurality of magnetic field conductors that can be configured within the inline demagnetization system of FIG. 1.
Figure 2H:
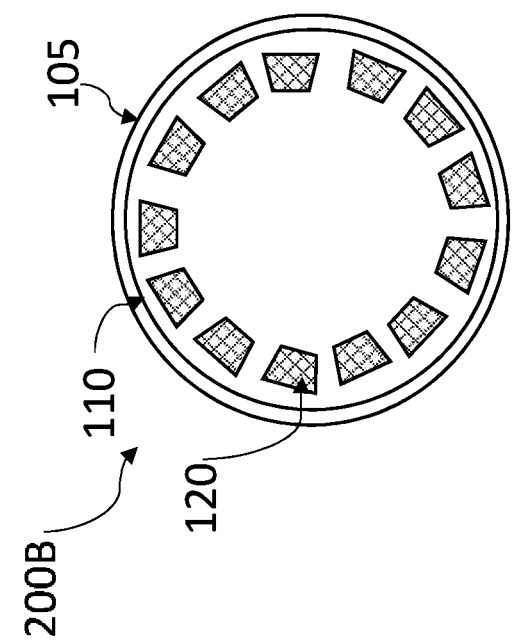

FIGS. 2H-2I illustrate exemplary embodiments of a second configuration 200B of a plurality of magnetic field conductors that can be configured within the inline demagnetization system 110 of FIG. 1. FIG. 2H illustrates an axial view of the inline demagnetization system 110 positioned within pipe 105. As shown in FIG. 2H, a plurality of thirteen magnetic field conductors 120 are configured around the circumference of the system 110 and the pipe 105.

FIG. 2I illustrates a cross-sectional view of the inline demagnetization system 110 of FIG. 1 and corresponds to the configuration 200B introduced in FIG. 2H. As shown in FIG. 2I, the configuration 200B includes multiple magnetic field conductors 120 (e.g., 120A, 120B, 120C, . . . 120N) arranged as axially oriented magnetic field conductors 120. A number of magnetic field conductors 120 may be contemplated for inclusion in configuration 200B. For example, the inline demagnetization system 110 arranged in configuration 200B can include 2, 3, 4, 5, 6, 7, 8, 9, 10, 11-15, 16-20, or more magnetic field conductors 120. In some embodiments, the spacing between each of the magnetic field conductors 120 can be similar or equal. In some embodiments, the spacing between each of the magnetic field conductors 120 can vary or be dissimilar.

Figure 2J:
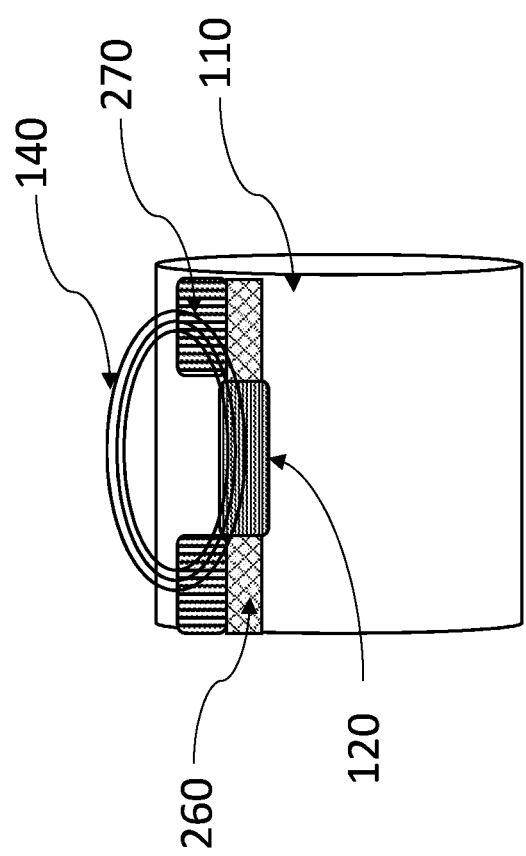
FIG. 2J illustrates an embodiment demonstrating an enhanced coupling of the magnetic field conductors to the wall of the pipe.

FIG. 2J illustrates an embodiment demonstrating an enhanced coupling of the magnetic field conductors 120 to the wall of the pipe 105 and transmission of the magnetic fields 140 into the pipe 105. Magnetic fields 140 generated by the magnetic field conductors 120 may be magnetically channeled within magnetic circuit devices 260 that are further configured within the inline demagnetization system 110 and introduced into the pipe wall 105 via flexible and compliant components 270, such as bristles. The compliant components 270 can be configured to transmit the magnetic field 140 in axial, radial, circumferential field directions.

Figure 2K:
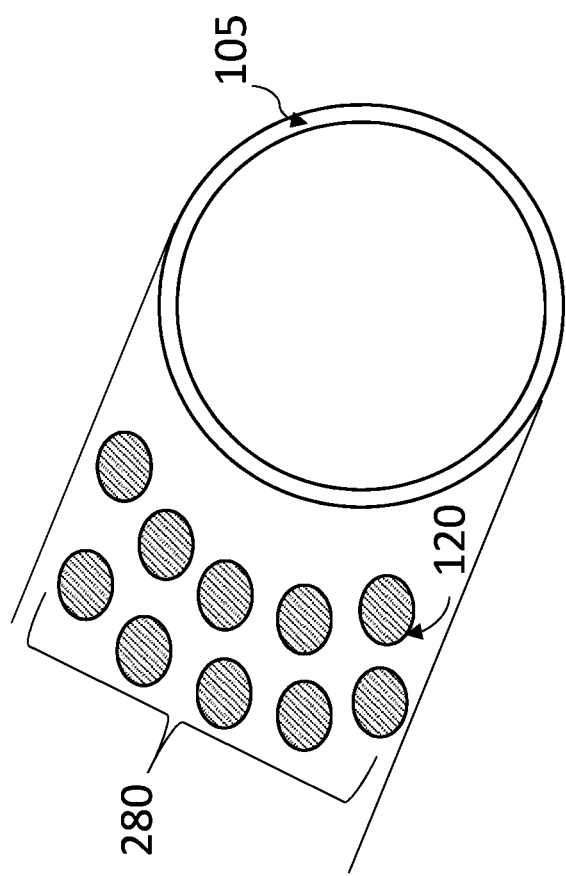
FIGS. 2K-2L illustrate embodiments of radially oriented magnetic field conductors of an inline demagnetization system.
Figure 2L:
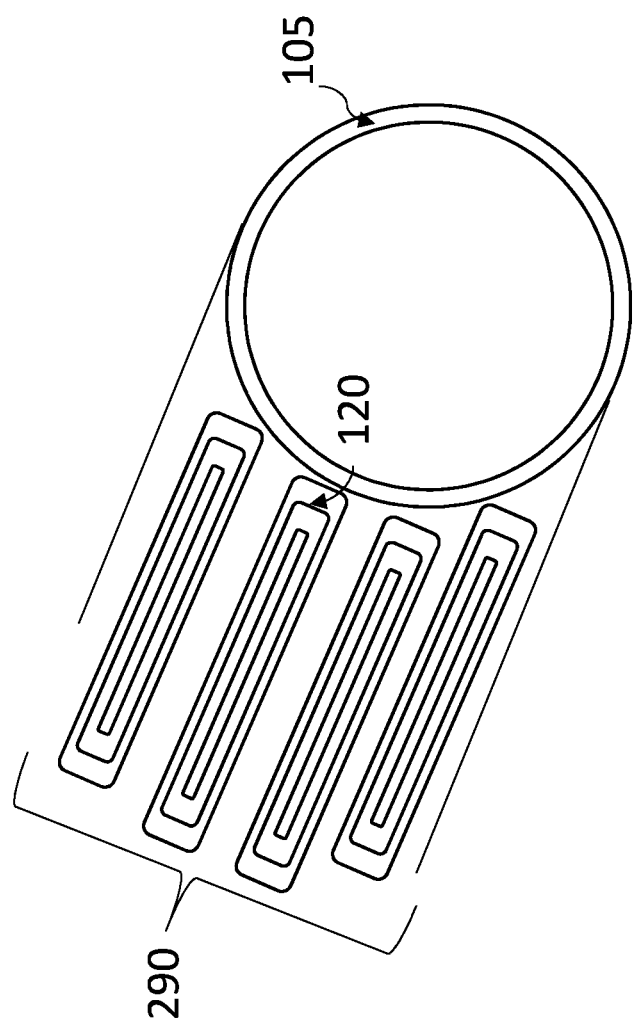

FIGS. 2K-2L illustrate embodiments of radially oriented magnetic field conductors 120 of an inline demagnetization system 110. As shown in FIG. 2K, the radially oriented magnetic conductors 120 may be configured as a plurality of geometrically symmetric conductors 280, such as one or more coils. As shown in FIG. 2L, the radially oriented magnetic field conductors 120 can be configured as one or more groups of asymmetric or "pancake" conductors 290, which as a plurality, cover the equivalent internal wall surface area of pipe wall 105.

It will be appreciated that the number and arrangement of the magnetic field conductors 120 can vary within the inline demagnetization system 110 and are configured to generate a sufficiently sized magnetic field into the pipe 105 in a consistent pattern to cause the reduction or elimination of any magnetic field which may be present in the pipe 105.

Figure 3:
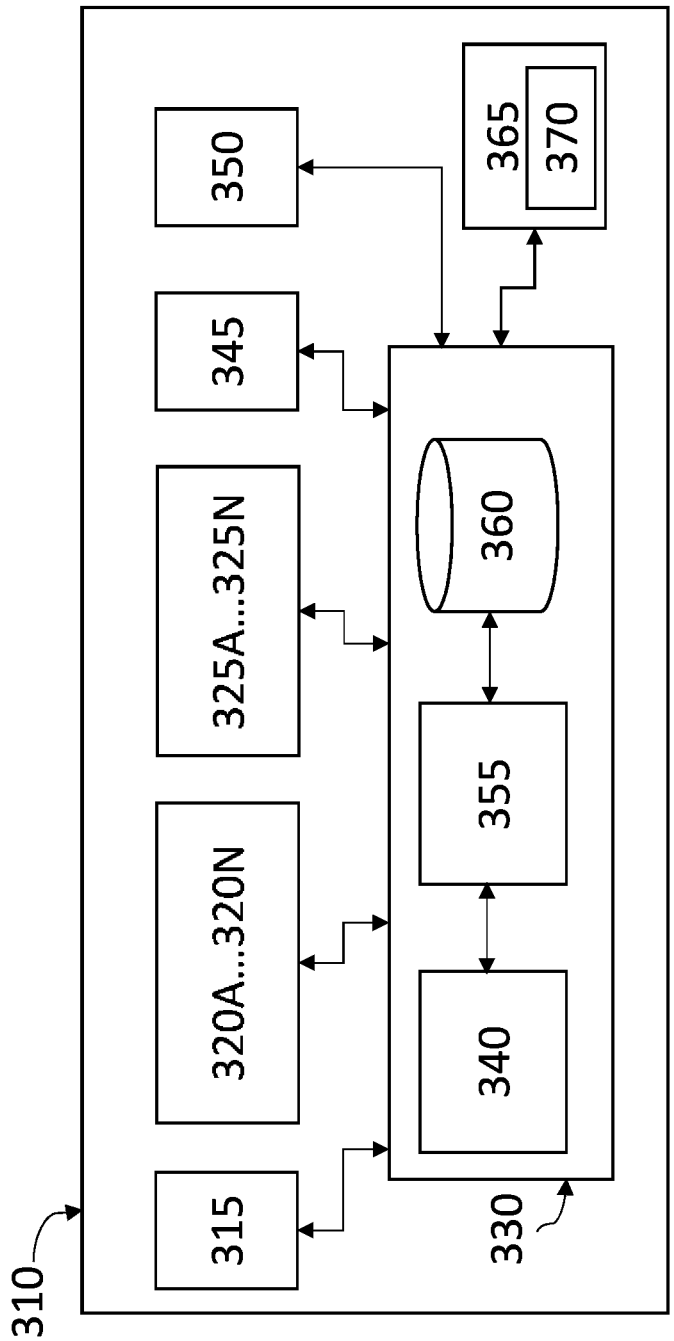
FIG. 3 illustrates an exemplary embodiment of an architecture of an inline demagnetization system corresponding to the inline demagnetization system shown and described in FIG. 1.

FIG. 3 illustrates an exemplary embodiment of an architecture of an inline demagnetization system 310 corresponding to the inline demagnetization system 110 shown and described in FIG. 1. As shown in FIG. 3, the inline demagnetization system 310 includes a self-contained power supply 315, a plurality of magnetic field conductors 320A . . . 320N, and a plurality of positioning mechanisms 325A . . . 325N. The inline demagnetization system 310 can include one or more magnetic field conductors 320 and two or more positioning mechanisms 325 depending on the design and configuration of the system 310. The inline demagnetization system 310 also includes a controller 330, a position sensing system 345 and a magnetic field sensing system 350. The inline demagnetization system 310 also includes a computing device 365 which can be coupled to the controller 330 and can include an output device 370, such as a display or similar device suitable to provide operational pipeline data, position data, magnetic field data, and data associated with demagnetization operations to a user or other computing device. Operational pipeline data can include map data associated with a configuration of pipes forming the operational pipeline. The operational pipeline data can also include data associated with couplings, linkages, pipe materials, repair data, or the like that are associated with a pipe or portions of a pipe. The controller 330 includes a communication interface 340, a processor 355, and a memory 360.

The self-contained power supply 315 can store and provide electrical power to components of the inline demagnetization system 310, such as any of the magnetic field conductors 320A . . . 320N, any of the positioning mechanisms 325A . . . 325N, the controller 330, the position sensing system 345, and/or the magnetic field sensing system 350. The self-contained power supply 315 can include one or more primary batteries, such as non-rechargeable batteries including one or more alkaline batteries, aluminum-air batteries, zinc-air batteries, lithium-air batteries, and magnesium batteries. In some implementations one or more of the primary batteries may be replaced with a rechargeable battery or rechargeable battery bank. For example, in some implementations, the self-contained power supply 315 can include one or more rechargeable batteries such as a Zinc-Manganese Dioxide rechargeable battery.

The inline demagnetization system 310 also includes a plurality of magnetic field conductors 320A . . . 320N. The magnetic field conductors 320 can receive control signals generated by the controller 340 which can cause each of the magnetic field conductors 320 to emit a magnetic field at specific amplitudes and frequency patterns. The magnetic field is generated to reduce, eliminate, or otherwise mitigate a magnetic field that is present at a given location in a portion of a pipe where the inline demagnetization system 310 is located. The plurality of magnetic field conductors 320 can also be configured as a phased array whereby each individual magnetic field conductor can be independently controlled and operated via the controller 340.

The inline demagnetization system 310 includes a plurality of positioning mechanisms 325A . . . 325N. The positioning mechanisms 125 enable the inline demagnetization system 110 to move within the pipe 105. The positioning mechanisms 125 can include a variety of mechanical linkages configured to position the system 110 at a desired location within the pipe 105 and in sufficient contact with the inner surface of the pipe 105 to enable the system 110 to perform demagnetization operations to reduce to magnetic field present in the pipe 105 at a particular location. In one embodiment, the positioning mechanisms 325 are motorized such that each is operably connected to the controller 340 and such that control signals received from the controller 340 can cause the individual positioning mechanisms 325 to operate causing the system 310 to stop, move or be positioned within the pipe 105, either in response to active sensory input from or instructions for a preset list of locations, programmed into controller 340 prior to its initial launching operation.

The inline demagnetization system 310 also includes a position sensing system 345 that can provide independent position data to the controller 330. In some embodiments, the position sensing system 345 can include one or more odometers and one or more accelerometers. The inline demagnetization system 310 can also include a magnetic field sensing system 350. The magnetic field sensing system 350 can provide data associated with the residual magnetic field present within the pipe 105 to the controller 330, which can be further used to control the overall position of system 310.

The inline demagnetization system 310 includes a controller 330. The controller 330 includes a communications interface 340, a processor 355, and a memory 360. The controller 330 can be configured to control operation of any of the magnetic field conductors 320 and any of the positioning mechanisms 325. The controller 330 can be configured to receive or acquire data from the position sensing system 345 and the magnetic field sensing system 350. As used herein, a "controller" is a device or collection of devices that serve to govern the performance of a device or collection of other devices in a predetermined manner. A controller includes one or more processors, such as application specific integrated circuits (ASICs), field programmable gate arrays (FPGAs), or microprocessors, configured to receive an electrical input signal from sensors or devices associated with a process being measured, compare the input signal values with predetermined control point values or other programmable logic configured on the processors in order to determine and generate the appropriate output signal to the devices controlling the process being measured.

The communications interface 340 manages data exchanges via a network interface card (also referred to as network interface driver). The communications interface 340 handles the physical and data link layers of the OSI model for network communication to other devices 365. In some implementations, some of the communications interface 340 tasks are handled by the processor 355. In some implementations, the communications interface 340 is part of the processor 355. In some implementations, an inline demagnetization system 310 has multiple communications interfaces 340. The network interface ports configured in a network interface card are connection points for physical network links. In some implementations, the communications interface 340 supports wireless network connections and an interface port associated with a network interface card is a wireless receiver/transmitter. Generally, the inline demagnetization system 310 exchanges data with other networked devices via physical or wireless links that interface with network interface driver ports configured in a network interface card. In some implementations, the communications interface 340 implements a network protocol such as Ethernet.

The processor 350 generally executes instructions received from memory 355. The instructions may include instruction, which when executed cause the controller to generate control signals. The control signals can include one or more configuration parameters associated with the operation of the inline demagnetization system 310, such as generating a magnetic field from the magnetic field conductors 320 or positioning the inline demagnetization system 310 within the pipe 105 via the positioning mechanism 325. The processor 355 can execute instructions to estimate or calculate position data necessary to position the inline demagnetization system 310 at one or more locations within the pipe 105. The position data can be provided as inputs to one or more preconfigured position algorithms that are stored in memory 360 and used to control the overall position of the inline demagnetization system 310. The processor 355 is operably connected to the controller 340 and the memory 360. The processor 355 may be any logic circuitry that processes instructions, e.g., instructions fetched from the memory 360. In many embodiments, the processor 355 is a microprocessor unit or special purpose processor. The inline demagnetization system 310 may be based on any processor, or set of processors, capable of operating as described herein to perform the methods described in relation to FIGS. 4 and 5. The processor 355 may be a single core or multi-core processor. The processor 355 may be multiple processors. In some implementations, the processor 355 can be configured to run multi-threaded operations. In some implementations, the processor 355 may be configured to operate and communicate data in an Internet-of-Things environment. In other implementations, the processor 355 may be configured to operate and communicate data in an environment of programmable logic controllers (PLC). In such implementations, the methods shown in FIGS. 4 and 5 can be implemented within the Internet-of-Things or PLC environments enabled by the functionality of the processor 355.

The memory 360 may be any device suitable for storing computer readable data. The memory 360 may be a device with fixed storage or a device for reading removable storage media. Examples include all forms of non-volatile memory, media and memory devices, and semiconductor memory devices (e.g., EPROM, EEPROM, SDRAM, and flash memory devices). An inline demagnetization system 310 may have any number of memory devices 360. The memory 360 can be configured to store control signals, including one or more configuration parameters of the inline demagnetization system 310. In some embodiments, the memory 360 can store one or more position algorithms used to determine locations within the pipe 105. In some embodiments, the memory 360 can store one or more preset positions or locations within the pipe 105 based on position data acquired from or received by the position sensing system 345.

Figure 4:
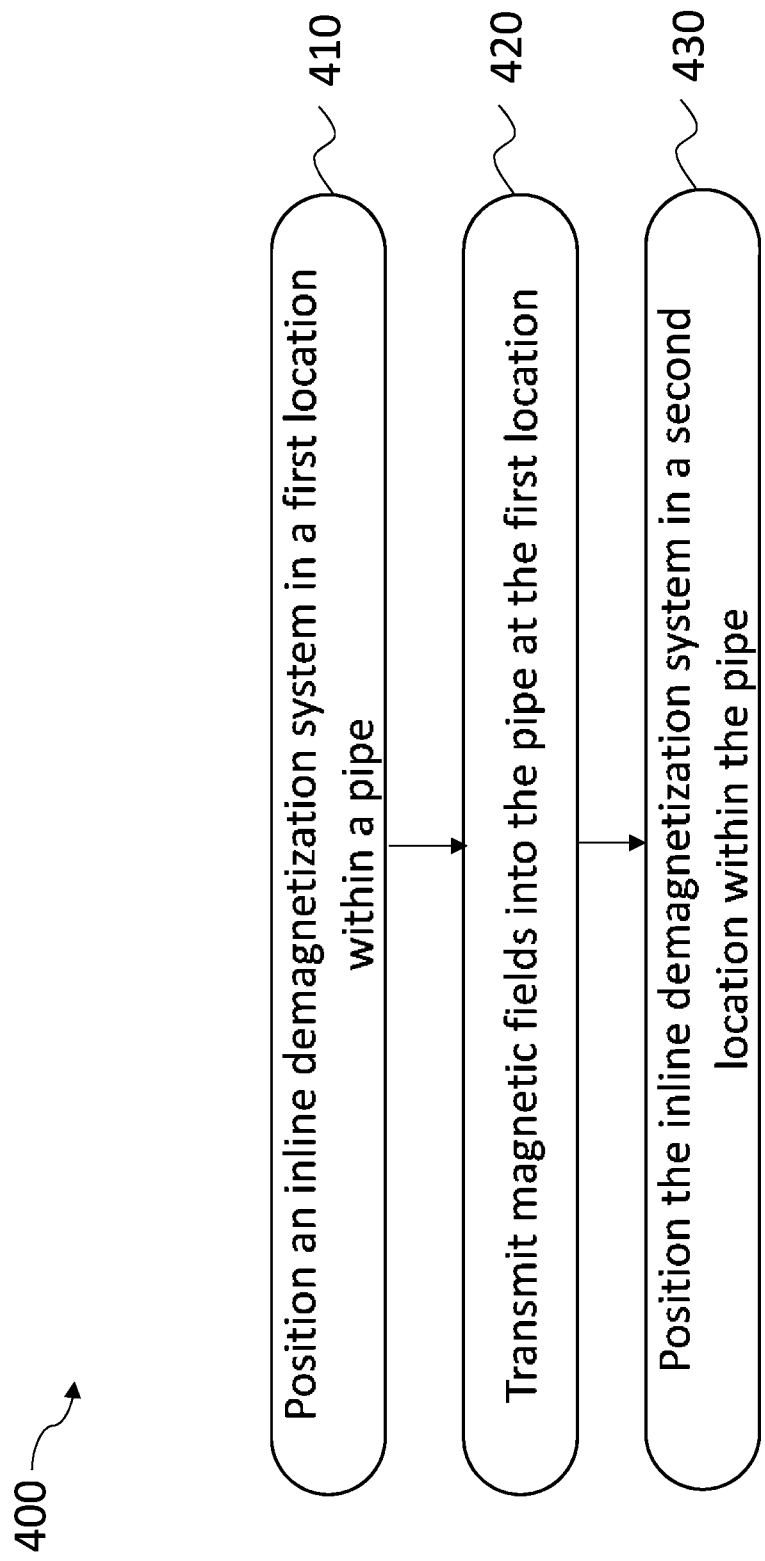
FIG. 4 is a process diagram illustrating an example process performed by an embodiment of an inline demagnetization system during actively controlled positioning and described in relation to FIGS. 1 and 3.

FIG. 4 is a process diagram illustrating an example process 400 performed by an embodiment of an inline demagnetization system with actively controlled positioning, such as the inline demagnetization system 110 described in relation to FIG. 1 and the system 310 described in relation to FIG. 3.

At operation 410, the inline demagnetization system 110 is positioned in a first location within a pipe. The pipe 105 can be included in an operational pipeline in which a product may or may not be present. The inline demagnetization system 110 may position itself in the first location based on control signals received from the controller 330. In some embodiments, the controller 330 may receive location data via the communications interface 340 and may provide the location data to the processor 355 to determine the first location within the pipe 105 based on the location data. In other embodiments, the location data may be stored in memory 360 and retrieved by the processor 355 for use in determining the first location. As a result of determining the first location, the controller 330 may generate control signals to cause the inline demagnetization system 110 to move or position itself in the first location using the plurality of positioning mechanisms 125.

At operation 420, the inline demagnetization system 110 transmits a magnetic field into the pipe 105 at the first location. The magnetic field can be generated and transmitted by magnetic field conductors 120 based on the control signals received from the controller 330. The control signals can include one or more configuration parameters, which can be used to determine frequencies and amplitudes of the magnetic fields to be transmitted into the pipe 105. In some embodiments the configuration parameters can be stored in the memory 360. The configuration parameters can then be retrieved from memory 360 by the processor 355 and included in the control signal generated by the controller 330 to cause the magnetic field conductors 120 to transmit the magnetic field into the pipe 105 to reduce the magnetic field present at the first location.

At operation 430, the inline demagnetization system 110 is positioned in a second location within the pipe. As a result of reducing or eliminating the magnetic field at the first location of the pipe 105, the inline demagnetization system 110 can reposition itself or receive control signals causing the system 110 to relocate to a second location in a manner similar to positioning the system 110 in regard to the first position described above.

In one embodiment, operations 410-430 can be repeatedly performed to enable the inline demagnetization system 110 to actively travel to multiple locations within the pipe 105 and transmitting the magnetic field into the pipe 105 at each location, independently of product flow. By repeatedly performing these operations, the inline demagnetization system 110 can travel or move along an entire length of pipe 105 and/or within an entire pipeline of operational pipes to reduce the magnetic field present in the pipe or pipeline.

In another embodiment, operations 410-430 can be repeatedly performed in response to movement of the inline demagnetization system 110 which can result from movement of the flow of product within the pipe 105. The inline demagnetization system 110 can transmit the magnetic fields 140 into the pipe 105 as fully continuous transmissions or at preset distance increments (e.g. every 1 inch), such that the second location in operation 430 is a result of incremental movement of the inline demagnetization system 110 from its first position in operation 410. By repeatedly performing these operations, the inline demagnetization system 110 can travel or move along an entire length of pipe 105 and/or within an entire pipeline of operational pipes to reduce the magnetic field present in the pipe or pipeline.

Figure 5:
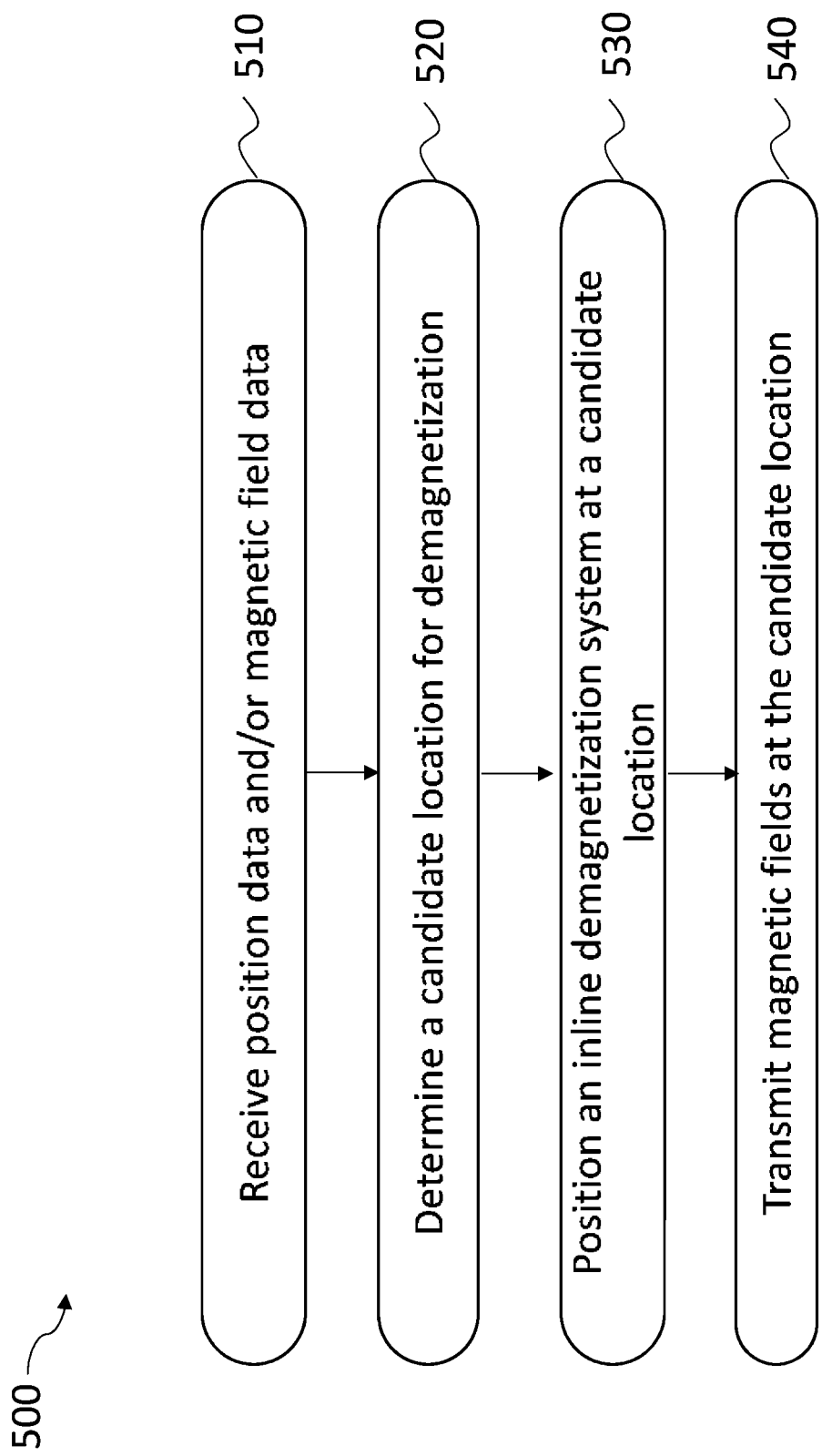
FIG. 5 is a process diagram illustrating an example process performed in an embodiment of the inline demagnetization system configured to receive position data and magnetic field data from a position sensing system and a magnetic field sensing system, respectively.

FIG. 5 is a process diagram illustrating an example process 500 performed in an embodiment of the inline demagnetization system 110 configured to continuously collect and store position data from the position sensing system 145 and magnetic field data from the magnetic field sensing system 150. The position data and the magnetic field data can be provided to the controller 330 to determine suitable candidate locations to perform demagnetization using the preset position algorithms stored in the memory 360 of the controller 330. Based on determining a candidate location, the controller 330 can execute instructions causing the magnetic field conductors 120 to transmit magnetic fields 140 into the pipe 105 to achieve demagnetization at the candidate location of the pipe.

In operation 510, the controller 330 receives position data and/or magnetic field data from the position sensing system 145 and the magnetic field sensing system 150, respectively. In some embodiments the controller 330 can poll the position sensing system 145 and/or the magnetic field sensing system 150 for the position data and/or magnetic field data continuously or at predetermine intervals of time. In some embodiments, the position sensing system 145 and/or the magnetic field sensing system 150 can be configured to continuously collect and transmit the position data and/or magnetic field data top the server in real-time or near real-time.

In operation 520, the controller 330 can determine a candidate location for demagnetization based on the position data and/or the magnetic field data received in operation 510. The controller 330 can determine one or more candidate locations to perform demagnetization using one or more preset algorithms configured within the controller 330. In some embodiments, the controller 330 can determine the candidate locations based on criteria associated with the received position data and/or magnetic field data. For example, the controller 330 can be configured to compare magnetic field data received from the magnetic field sensing system 150 to a magnetic field threshold or criteria stored in memory 360. Based on determining the magnetic field data exceeds or is lower than a particular magnetic field threshold, the controller 330 can execute instructions to position the inline demagnetization system 110 at the candidate location. In some embodiments, the controller 330 can determine the candidate locations based on a predetermined list of locations that can be stored in the memory 360.

In operation 530, the controller 330 positions the inline demagnetization system 110 at a candidate location. The controller 330 can execute instructions causing the positioning mechanisms 125 to maneuver the inline demagnetization system 110 to the determined candidate location within the pipe 105.

In operation 540, the magnetic field conductors 120 transmit magnetic fields 140 at the candidate location. Once positioned at the determined candidate location, the controller 330 can execute instructions to cause the magnetic field conductors 120 to transmit a magnetic field suitable to demagnetize the a magnetic field present at the candidate location of the pipe 105.

Without in any way limiting the scope, interpretation, or application of the claims appearing below, a technical effect of one or more of the example implementations disclosed herein may include one or more of the following, for example, by configuring an inline demagnetization system with a self-contained power supply, some implementations of the current subject matter can enable a reduction or elimination in a magnetic field present at one or more locations of a pipe within an operational pipeline. The current subject matter can enable the inline demagnetization system to demagnetize a magnetic field present in the pipeline without needing to discontinue operations of the pipeline or removing magnetize portions of the pipeline prior to inspection and/or repair. As compared to some conventional systems, the current subject matter can enable demagnetization operations or solutions that may be less expensive; require fewer resources, and are less disruptive to pipeline production operations. Further, the current subject matter can enable rapidly deploying and positioning the inline demagnetization system within the pipeline without an external power supply or external positioning mechanisms. The current subject matter can also improve the safety of inspection and repair operations as a result of demagnetizing pipes configured in the pipeline prior to the inspection and repair operations.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   an inline demagnetization device configured to travel within a pipe of an operational pipeline, the inline demagnetization device including,
      a self-contained power supply,
      a position sensing system including at least one accelerometer, the position sensing system configured to measure movement and travel of the inline demagnetization device within the pipe and to generate position data identifying a location of the inline demagnetization device within the pipe,
      a plurality of positioning mechanisms, each positioning mechanism extending radially away from a surface on the inline demagnetization device to which each positioning mechanism is attached and angled toward a rear portion of the inline demagnetization device into contact with an inner surface of the pipe, the plurality of positioning mechanisms receiving power from the self-contained power supply and operable to cause the inline demagnetization device to travel through the pipe in forward direction or a backward direction responsive to the power received from the self-contained power supply, and
      a plurality of magnetic field conductors including a plurality of coil elements arranged radially along an inner surface of the inline demagnetization device, each of the magnetic field conductors configured to generate magnetic fields into the pipe at a first location in a radial direction, the generated magnetic fields causing a reduction of magnetization in the pipe at the first location; and
   a controller, coupled to the inline demagnetization device, the controller including a processor and a memory, wherein the processor is configured to execute computer-readable, executable instructions, stored in the memory, which when executed cause the processor to perform operations including,
positioning the inline demagnetization device in the first location within the pipe based on first position data received from the position sensing system,
transmitting the magnetic fields into the pipe at the first location, and
positioning the inline demagnetization device in a second location within the pipe based on second position data received from the position sensing system.

2. The system of claim 1, wherein the inline demagnetization device further comprises a magnetic field sensing system configured to provide magnetic field data associated with the first location and/or the second location of the pipe to the controller.

3. The system of claim 2, wherein the instructions further cause the processor to perform operations including,
receiving magnetic field data from the magnetic field sensing system, and
determining a candidate location for transmitting the magnetic fields into the pipe at the first or second location based on the magnetic field data.

4. The system of claim 2, wherein transmitting magnetic fields into the pipe at the first location further includes determining an amplitude and a frequency of the magnetic fields to be transmitted into the pipe based on the position data and/or the magnetic field data associated with the first location and/or the second location.

5. The system of claim 1, wherein the operational pipeline includes a flow of a product within the pipe.

6. The system of claim 5, wherein positioning the inline demagnetization device in a first location within the pipe is achieved via the flow of the product within the pipe.

7. The system of claim 1, wherein the plurality of magnetic field conductors are arranged within the inline demagnetization device to generate the magnetic fields in an axial direction.

8. The system of claim 1, wherein the plurality of magnetic field conductors are arranged within the inline demagnetization device to generate the magnetic fields in a circumferential direction.

9. The system of claim 1, wherein each magnetic field conductor of the plurality of magnetic field conductors includes a magnetic circuit device configured to channel the transmitted magnetic fields into the pipe and a flexible linkage configured to couple each magnetic field conductor to an inner surface of the pipe.

10. The system of claim 1, wherein the plurality of coil elements are arranged as a plurality of geometrically symmetric coil elements or a plurality of geometrically asymmetric coil elements.

11. The system of claim 1, further comprising a computing device, including a display, the computing device configured to provide operational pipeline data, position data, magnetic field data, or data associated with demagnetization operations to a user via the display.

12. A method comprising:
positioning an inline demagnetization device in a first location within a pipe of an operational pipeline via a plurality of positioning mechanisms, the inline demagnetization device including a self-contained power supply and a positioning system including an accelerometer configured to generate position data, wherein the plurality of positioning mechanisms extend radially away from a surface on the inline demagnetization device to which each positioning mechanism is attached and angled toward a rear portion of the inline demagnetization device into contact with an inner surface of the pipe, the plurality of positioning mechanisms receiving power from the self-contained power supply and operable to cause the inline demagnetization device to articulate forward or backward through the pipe responsive to the power received from the self-contained power supply and based on first position data received from the position sensing system;
transmitting magnetic fields into the pipe at a first location within the pipe via a plurality of magnetic field conductors including a plurality of coil elements arranged radially along an inner surface of the inline demagnetization device, each coil element configured to generate magnetic fields into the pipe at the first location in a radial direction and to cause a reduction of magnetization in the pipe at the first location; and
articulating the inline demagnetization device to a second location within the pipe via the plurality of positioning mechanisms based on second position data received from the position sensing system.

13. The method of claim 12, wherein the inline demagnetization device further comprises a magnetic field sensing system configured to provide magnetic field data associated with the first location and/or the second location of the pipe to a controller coupled to the inline demagnetization device.

14. The method of claim 13, further comprising,
receiving, by the controller, magnetic field data from the magnetic field sensing system, and
determining, by the controller, a candidate location for transmitting magnetic fields into the pipe based on the magnetic field data.

15. The method of claim 13, wherein transmitting magnetic fields into the pipe at the first location or the second location further includes determining an amplitude and a frequency of the magnetic fields to be transmitted into the pipe based on the position data and/or the magnetic field data of the first location and/or the second location.

16. The method of claim 12, wherein the operational pipeline includes a flow of a product within the pipe.

17. The method of claim 16, wherein positioning the inline demagnetization device in a first location within the pipe is achieved via the flow of the product within the pipe.

18. The method of claim 12, wherein the plurality of magnetic field conductors are arranged within the inline demagnetization device to generate the magnetic fields in an axial direction.

19. The method of claim 12, wherein the plurality of magnetic field conductors are arranged within the inline demagnetization device to generate the magnetic fields in a circumferential direction.

20. The method of claim 12, wherein each magnetic field conductor of the plurality of magnetic field conductors includes a magnetic circuit device configured to channel the transmitted magnetic fields into the pipe and a flexible linkage configured to couple each magnetic field conductor to an inner surface of the pipe.

21. The method of claim 12, wherein the plurality of coil elements are arranged as a plurality of geometrically symmetric coil elements as a plurality of geometrically asymmetric coil elements.

22. The method of claim 12, wherein the controller is coupled to a computing device, including a display, the computing device configured to provide operational pipeline data, position data, magnetic field data, or data associated with demagnetization operations to a user via the display.

23. A non-transitory machine readable storage medium containing program instructions, which when executed cause one or more processors to perform a method of:

positioning an inline demagnetization device in a first location within a pipe of an operational pipeline via a plurality of positioning mechanisms, the inline demagnetization device including a self-contained power supply and a positioning system including an accelerometer configured to generate position data, wherein the plurality of positioning mechanisms extend radially away from a surface on the inline demagnetization device to which each positioning mechanism is attached and angled toward a rear portion of the inline demagnetization device into contact with an inner surface of the pipe, the plurality of positioning mechanisms receiving power from the self-contained power supply and operable to cause the inline demagnetization device to articulate forward or backward through the pipe responsive to the power received from the self-contained power supply and based on first position data received from the positioning sensing system;

transmitting magnetic fields into the pipe at a first location within the pipe via a plurality of magnetic field conductors including a plurality of coil elements arranged radially along an inner surface of the inline demagnetization device, each coil element configured to generate magnetic fields into the pipe at the first location in a radial direction and to cause a reduction of magnetization in the pipe at the first location;

articulating the inline demagnetization device to a second location within the pipe via the plurality of positioning mechanisms based on second position data received from the positioning sensing system.

\* \* \* \* \*